US008464073B2

(12) United States Patent
Salessi

(10) Patent No.: US 8,464,073 B2
(45) Date of Patent: Jun. 11, 2013

(54) METHOD AND SYSTEM FOR SECURE DATA STORAGE

(75) Inventor: Nader Salessi, Laguna Nigel, CA (US)

(73) Assignee: Stec, Inc., Santa Ana, CA (US)

( * ) Notice: Subject to any disclaimer, the term of this patent is extended or adjusted under 35 U.S.C. 154(b) by 1509 days.

(21) Appl. No.: 11/520,014

(22) Filed: Sep. 13, 2006

(65) Prior Publication Data

US 2008/0065905 A1 Mar. 13, 2008

(51) Int. Cl.
*G06F 21/00* (2006.01)

(52) U.S. Cl.
USPC ............... 713/193; 726/26; 726/27; 713/171; 713/194; 380/28; 380/44; 705/59; 455/466; 709/206

(58) Field of Classification Search
USPC ................................... 713/193, 194
See application file for complete search history.

(56) References Cited

U.S. PATENT DOCUMENTS

| 5,828,834 | A * | 10/1998 | Choi ................................. 726/18 |
| 6,731,731 | B1 * | 5/2004 | Ueshima ........................ 379/196 |
| 6,754,349 | B1 * | 6/2004 | Arthan ........................... 380/286 |
| 6,792,539 | B1 * | 9/2004 | Oishi et al. ..................... 713/194 |
| 7,162,037 | B1 * | 1/2007 | Schwenk ....................... 380/286 |
| 7,770,795 | B2 * | 8/2010 | Takashima et al. ............ 235/454 |
| 2002/0131595 | A1 * | 9/2002 | Ueda et al. ..................... 380/201 |
| 2002/0169960 | A1 * | 11/2002 | Iguchi et al. ................... 713/174 |
| 2002/0178366 | A1 * | 11/2002 | Ofir ................................ 713/182 |
| 2002/0178370 | A1 * | 11/2002 | Gurevich et al. .............. 713/189 |
| 2004/0068631 | A1 * | 4/2004 | Ukeda et al. ................... 711/163 |
| 2004/0107340 | A1 * | 6/2004 | Wann et al. .................... 713/153 |
| 2004/0225827 | A1 * | 11/2004 | Yokota et al. .................. 711/103 |
| 2005/0005092 | A1 * | 1/2005 | Jeong et al. .................... 713/150 |
| 2005/0114659 | A1 * | 5/2005 | Klein .............................. 713/165 |
| 2005/0246553 | A1 * | 11/2005 | Nakamura et al. ............. 713/193 |
| 2005/0257062 | A1 * | 11/2005 | Ignatius et al. ................ 713/176 |
| 2006/0050871 | A1 * | 3/2006 | Ranen et al. ..................... 380/37 |
| 2006/0107032 | A1 * | 5/2006 | Paaske et al. ..................... 713/2 |
| 2006/0156413 | A1 * | 7/2006 | Oh et al. ........................... 726/26 |
| 2007/0033419 | A1 * | 2/2007 | Kocher et al. ................. 713/193 |
| 2007/0050851 | A1 * | 3/2007 | Musha et al. .................... 726/27 |
| 2007/0174614 | A1 * | 7/2007 | Duane et al. ................... 713/168 |
| 2007/0186117 | A1 * | 8/2007 | Klein et al. ..................... 713/189 |
| 2007/0188183 | A1 * | 8/2007 | Holtzman et al. ............. 324/758 |
| 2007/0250718 | A1 * | 10/2007 | Lee et al. ........................ 713/186 |
| 2007/0266258 | A1 * | 11/2007 | Brown et al. ................... 713/183 |

OTHER PUBLICATIONS

Podesser et al., "Selective Bitplane Encryption for Secure Transmission of Image Data in Mobile Environments", Proceedings of the 5th IEEE Nordic Signal, 2002.*

* cited by examiner

*Primary Examiner* — Morshed Mehedi

(74) *Attorney, Agent, or Firm* — McDermott Will & Emery LLP

(57) ABSTRACT

A secure storage device includes a storage medium configured to securely store data received from a host. The storage device further includes a host interface configured to transfer data between the host and the storage device and an encryption engine. The encryption engine is configured to encrypt data received from a host using a key and provide the encrypted data to the storage medium for storage. The encryption engine is further configured to decrypt encrypted data received from the storage medium and provide the data to the host via the host interface. In response to a predetermined condition, the storage device is configured to disable the encryption engine thereby preventing the encrypted data stored thereon from being decrypted.

20 Claims, 7 Drawing Sheets

METHOD AND SYSTEM FOR SECURE DATA STORAGE

FIELD OF THE INVENTION

The present disclosure relates to data storage devices and, more particularly, to secure data transfer and storage in such devices.

BACKGROUND OF THE INVENTION

Generally, a data storage device is a computing device that reads data from and writes data onto storage media. A data storage device may contain moving parts or may not have any significant moving parts. An example of a data storage device with moving parts is a traditional disk drive where a disk (e.g., a spinning platter) rotates and has one or more heads that read and write data. There are different types of disk drives for different types of disks. For example, a hard disk drive (HDD) reads and writes hard disks, and a floppy drive (FDD) accesses floppy disks. A magnetic disk drive reads and writes magnetic disks, and an optical drive reads and writes optical disks. A data storage device without any significant moving parts is generally referred to as a solid-state drive. An example of a solid-state drive is a Flash drive.

Data storage devices are utilized in an increasing number of applications. Home computers, business servers, laptops, and many other electronic devices, such as routers, digital cameras, cell phones, and the like, use data storage devices. Certain applications require a high level of security for the data stored and transferred in the data storage device. These applications include banking applications, commercial applications, medical applications, criminal justice applications, military applications, radar systems, sonar systems, data recorders, tactical computers, fire-control systems, airborne reconnaissance systems, network systems, and the like.

Data security is an important concern for data storage devices used in these secure applications. For example, many operating systems and file systems do not actually erase data from a hard disk when deleting a file; instead, a directory or inode entry is merely deleted from a table. The actual data in the file remains on the hard disk until over-written. Even when data from a storage location has been deleted, the physical properties of the storage medium, such as magnetic hysteresis, can often allow the deleted data to be discovered.

In an attempt to allay some of these concerns, some solid-state drives offer a secure erase feature in which data is deleted and overwritten in each storage location multiple times (e.g., six times). The effectiveness of such a solution relies on the secure erase operation having enough time to complete before being interrupted and on the storage locations being in a re-writable condition. One component of many solid-state drives is storage space arranged in a number of Flash storage blocks. A typical aspect of such Flash storage blocks, or simply "Flash blocks," is that after significant usage they will often reach a certain state in which the data in the Flash block cannot be erased or re-written. It is still possible in this state, however, to read data from the Flash block, which poses a data security risk to the device.

Although typical solid-state drives routinely employ wear-leveling write algorithms to evenly distribute write operations across all the storage locations of the device, some Flash blocks will eventually wear out and can no longer be erased or re-written by a secure erase feature. Additionally, if data is not able to be erased for any reason from a solid-state drive, then that data remains readily available to any user who comes into possession of the solid-state drive. Accordingly, there is a need for improving data security of data storage devices.

SUMMARY OF THE INVENTION

The invention teaches a secure data storage device suitable for use in high-security applications. The storage device encrypts and stores data received from a host. When the data is requested by the host, the storage device decrypts the encrypted data and forwards it to the host. In this manner, data is securely stored thereby preventing unauthorized access to the data stored on the storage device.

According to one embodiment of the invention, a secure storage device is disclosed which includes a storage medium configured to securely store data received from a host. The storage device further includes a host interface configured to transfer data between the host and the storage device and an encryption engine. The encryption engine is configured to encrypt data received from a host using a key and to provide the encrypted data to the storage medium for storage. The encryption engine is further configured to decrypt encrypted data received from the storage medium and to provide the decrypted data to the host via the host interface.

According to another embodiment of the invention, a secure storage system is disclosed which includes a host and a secure storage device. The storage device includes a storage medium configured to securely store data received from a host. The storage device further includes a host interface configured to transfer data between the host and the storage device and an encryption engine. The encryption engine is configured to encrypt data received from a host using a key and to provide the encrypted data to the storage medium for storage. The encryption engine is further configured to decrypt encrypted data received from the storage medium and to provide the decrypted data to the host via the host interface.

According to another embodiment of the invention, a method for securely storing data is disclosed. The method includes the steps of receiving a command from a host and generating a key. If the command is a read command, encrypted data is retrieved from a storage medium and is decrypted. The decrypted data is then provided to the host. If the command is a write command, data received from the host is encrypted using the key and is stored in the storage medium.

The foregoing summary of the invention has been provided so that the nature of the invention can be understood quickly. A more detailed and complete understanding of the preferred embodiments of the invention can be obtained by reference to the following description of the invention together with the associated drawings.

DETAILED DESCRIPTION OF THE INVENTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art after reading the disclosure that the invention may be practiced without these specific details. In some instances, well known structures and components are shown in block diagram form in order to avoid obscuring the concepts of the invention. For example, a specific exemplary environment involving a solid-state drive having Flash block storage is described in detail. However, it will be apparent that the principles and concepts of various embodiments of the present invention do not rely on a specific storage device type or structure but are applicable to many other storage devices whether solid-state or not.

Figure 1:
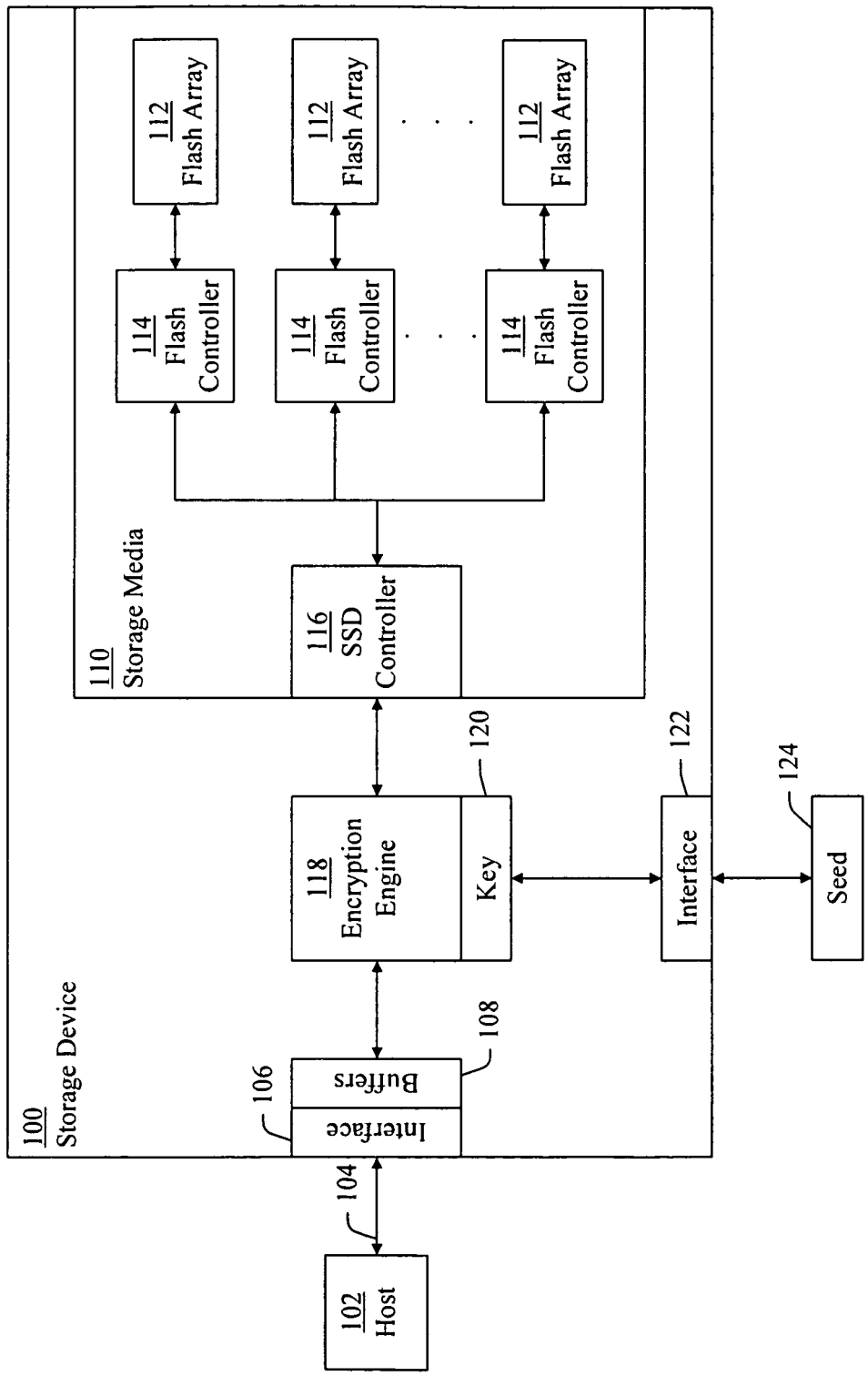
FIG. 1 depicts a block diagram of a storage device in accordance with one embodiment of the invention.

FIG. 1 depicts a block diagram of a storage device 100 in accordance with one embodiment of the invention. As is known in the art, a storage device typically includes a microprocessor and firmware (not shown) that controls the operation of the block elements depicted in FIG. 1. In operation, the storage device 100 communicates with a host system 102 to exchange data. The host system 102 may write data to the data storage device 100 to cause that data to be stored on the storage device 100 and may read data from the storage device 100 so as to retrieve data. The host system 102 may be any of a wide variety of computer-based platforms that rely on a storage device, such as storage device 100, for data storage. Such platforms include, for example, specialized systems as well as general purpose programmable systems.

The host system 102 includes a communications bus 104, as is known in the art, for exchanging data and commands with the storage device 100. For example, the bus 104 may be a Universal Serial Bus (USB), an Advanced Technology Attachment (ATA) bus, a Small Computer System Interface (SCSI) bus, a FireWire bus, a Fibre Channel connection, a wireless connection, an Ethernet connection, and a vast number of other commercially implemented buses, or a proprietary bus designed by, for example, the manufacturer of the host system 102 and/or the storage device 100. As for the storage device 100, an interface 106 is provided that operates with the bus 104. The interface 106 provides the electrical and logical interface components necessary to allow accurate communications with the host system 102 over the bus 104. The interface 106 may include one or more buffers 108 so that data can be received at the interface 106 at different rates of speed than it leaves the interface 106.

The storage device 100 also includes storage media 110 where data is physically stored in the storage device 100. The storage media 110 may be any of a variety of solid-state, magnetic, optical, or other types of media and may, for example, be solid-state Flash blocks included in each of the Flash arrays 112 depicted in FIG. 1. As is well known in the art, a Flash controller 114 controls how data is read from and written to each of the Flash arrays 112. A solid-state device (SSD) controller 116 controls the distribution of commands to the Flash controllers 114 and the transfer of data to and from the Flash controllers 114. This distribution of commands and data is performed by the SSD controller 116 using any of a number of algorithms known and practiced by those skilled in the art. Upon receiving a READ command, the relevant Flash controller(s) 114 retrieves the requested data from the appropriate location(s) within the Flash array(s) 112. Similarly, upon receiving a WRITE command, the relevant Flash controller(s) 114 causes the data to be written to an appropriate location(s) within the Flash array(s) 112. The read and write operations performed by the Flash controllers 114 are well known to those skilled in the art and will not be described further herein.

As shown in FIG. 1, information received at the interface 106 does not pass directly to the SSD controller 116 but, instead, passes through an encryption engine 118. The purpose of the encryption engine 118 is to encrypt data that is received from the host system 102 to be written to the storage media 110 and to decrypt data retrieved from the storage media 110 to be sent to the host system 102. Accordingly, the connections between the different elements in FIG. 1 are logical in nature and do not necessarily reflect the actual bus lines that exist within the storage device 100. For example, a READ command may include both the command itself and the data location to be read. This information does not necessarily have to pass through the encryption engine 118 because it does not require encryption; however, when the data is read from the storage media 110 it passes through the encryption engine 118 in order to be decrypted and passed to the interface 106 to be sent to the host system 102. A WRITE command typically includes the command itself, the data to be written, and the location to be written to. Of such information, only the data to be written must necessarily pass through the encryption engine 118 to be encrypted. The other pieces may be passed to the SSD controller 116 without being encrypted. The interface 106 may also be used to pass commands to the storage device 100 that do not involve reading or writing data. As explained in more detail later, the host system 102 may send commands to instruct the storage device 100 to, for example, delete a key 120, disable an interface 122, or erase the storage media 110.

The encryption engine 118 may be implemented in a variety of different ways. The encryption engine 118, for example, may be a single ASIC (Application-Specific Integrated Circuit) specially designed for a particular encryption/decryption algorithm, it may be a FPGA (Field Programmable Gate-Array), it may be a programmable microcontroller or processor, or it may be a combination of hardware and software components. One of ordinary skill will recognize that any of the various ways of implementing an encryption engine that are known in the art are contemplated within the scope of the present invention. One exemplary encryption engine that has been widely implemented in various forms uses the Advanced Encryption Standard (AES). This symmetrical block cipher may advantageously be used as the encryption engine 118 to encrypt every bit that is stored within storage media 110 and to decrypt the bits that are retrieved from the storage media 110. Other encryption methods may be used as well and may include stream ciphers rather than block ciphers as well as be based on asymmetrical keys rather than symmetrical keys.

In a symmetrical system, the same key is used to encrypt data as well as to decrypt data. Such a key 120 is depicted in FIG. 1. If an asymmetrical encryption scheme is used, then more than one key is used by the encryption engine 118. In certain embodiments of the present invention, the storage media may be logically divided into distinct secure areas so that a different key is used depending on where the data is being read from or being written to.

Although the key 120 may be stored, temporarily or permanently, in some type of storage media within the encryption engine 118, the security of the storage device 100 may be enhanced by, instead, generating the key 120 on-the-fly for each access to the storage media 110. For example, the encryption engine 118 may use a seed 124 to generate the key 120 used to encrypt and decrypt data without actually storing the key 120. The seed 124 is a value, or seed value, used to generate the key 120. According to one embodiment of the invention, the seed 124 is external to the storage device 100 and is accessible to the encryption engine 118 via the interface 122. The interface 122 may be any of a number of interfaces known to those skilled in the art that interconnect and facilitate communication between devices. For example, the interface 122 may be a USB port and the seed 124 may be implemented using an electronic device or token that plugs into the USB port. By way of another example, the interface 122 may be connected to the bus 104, or some other bus of host system 102, and the seed 124 may be located in a storage medium (volatile or non-volatile) within the host system 102. In this manner, the seed 124 is accessible to the encryption engine 118 whenever the storage device 100 is connected to the host system 102.

Figure 2:
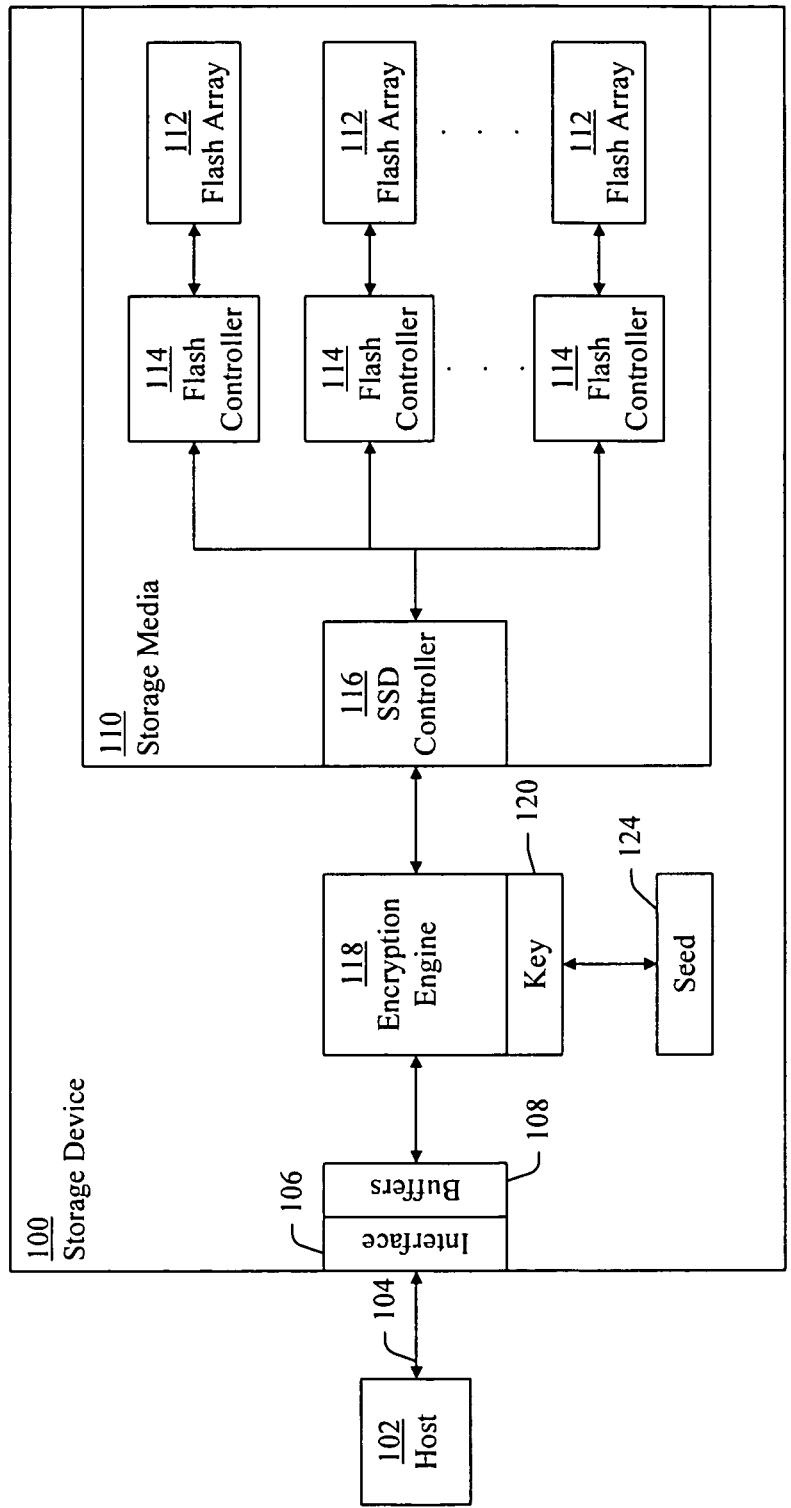
FIG. 2 depicts a block diagram of a storage device in accordance with one embodiment of the invention.

In an alternative embodiment of the invention, the seed 124 is stored within the storage device 100, as depicted in FIG. 2. During manufacturing of the storage device 102, the seed 124 may be generated and stored in firmware, or some other storage medium, within the storage device 102. One exemplary method for creating the seed 124 is to apply a random number to the serial number of the storage device 100, to the time of manufacture of the storage device 100, or to some other variable value. One skilled in the art will recognize other methods for generating seed values to be used for generating keys.

Using the seed 124 to generate the key 120, and in particular when the seed 124 is internal to the storage device 100, allows the storage device 100 to perform its encryption and decryption transparently from the perspective of the user. Regardless of where the storage device 100 is used, data is stored in an encrypted format but can be retrieved in an unencrypted format. Accordingly, as explained later, there are provisions provided by the storage device 100 for disabling the encryption engine 118 when needed.

In an alternative embodiment of the invention, a password may be used by the encryption engine 118 to generate the key 120. The password may be provided to the encryption engine 118 via the interface 122. Alternatively, the host system 102 may supply the password when prompted by a software application executing on the host system 102. The password may be used in place of the seed 124 to generate the key 120, or it may be used in combination with the seed 124 to generate the key 120. One skilled in the art will recognize that many alternative methods and techniques for providing a password to the encryption engine 118 may be used without departing from the scope of the present invention.

In the event that the host system 102, or a user of the host system 102, determines that there is a risk to the security of the data stored on the storage device 100, the host system 102 or the user may simply remove the seed 124 and/or the password from the interface 122, thereby preventing the retrieval of unencrypted data. In instances where the seed 124 is stored within the storage device 100, other alternatives that do not require user interaction may be used (as explained in detail later). Also, the key 120 or some other aspect of the encryption engine 118 may be disabled to prevent retrieval of unencrypted data.

In addition to disabling all or portions of the seed 124, the key 120, the password, or some combination thereof, there are alternative ways to disable the encryption engine 118 encompassed within the spirit and scope of the present invention. For example, the encryption/decryption algorithm employed by the encryption engine 118 may be stored in non-volatile storage media within the storage device 100 such as, for example, an erasable storage medium such as an EPROM (Erasable Programmable Read-Only Memory) or Flash. While the data stored in this storage medium does not typically change, the data may be deleted or overwritten, either completely or partially, in the event of a security risk to the storage device 100.

With the encryption/decryption algorithm stored as executable code that utilizes the seed 124, and/or a password, to encrypt/decrypt data, removing or altering the code for some of the steps of the algorithm will effectively disable the encryption/decryption algorithm. In operation, when a security risk is detected and the host system 102 instructs the storage device 100 to disable the encryption engine 118, the controller (not shown) of the storage device will delete or overwrite a portion of the executable steps stored in the non-volatile storage.

The steps of the algorithm chosen to be deleted are advantageously selected so that when the modified algorithm is used by the encryption engine 118, some apparently unciphered data will be generated based on encrypted data retrieved from the storage media 110. An alternative would be to delete portions of the code so as to make the algorithm entirely unexecutable. In the first alternative, however, even if someone in possession of the storage device 100 has the password, the key 120 and/or the seed 124, the resulting data would not be correctly decrypted while the storage device 100 appears to be working properly. In the latter alternative, the data remains secure but an unauthorized user may readily discern that the components of the storage device 100 have been tampered with.

Some encryption algorithms generate a series of keys or sub-keys to apply at different times during the encryption/decryption steps. Modifying or deleting these specific portions of executable code is one exemplary technique for effectively disabling the encryption engine 118 without destroying the appearance that the encryption engine 118 is functioning properly. For example, if twelve sub-keys are generated, then the code for generating three or more of the sub keys could be deleted, disabled or modified. Executing such a modified algorithm would not properly decrypt data retrieved from the storage media 110, thereby maintaining the security of the data.

Some encryption algorithms operate in multiple rounds. For example, the previously mentioned AES method bases the number of rounds on the key size. One exemplary way to disable an encryption engine implementing AES, or a similar algorithm, would be to modify the portion of the executable code that controls the number of rounds executed. Changing this code to generate a different number of rounds to execute would effectively prevent decrypting the data (even given the correct password or seed) that was encrypted using the correct number of rounds.

Figure 3:
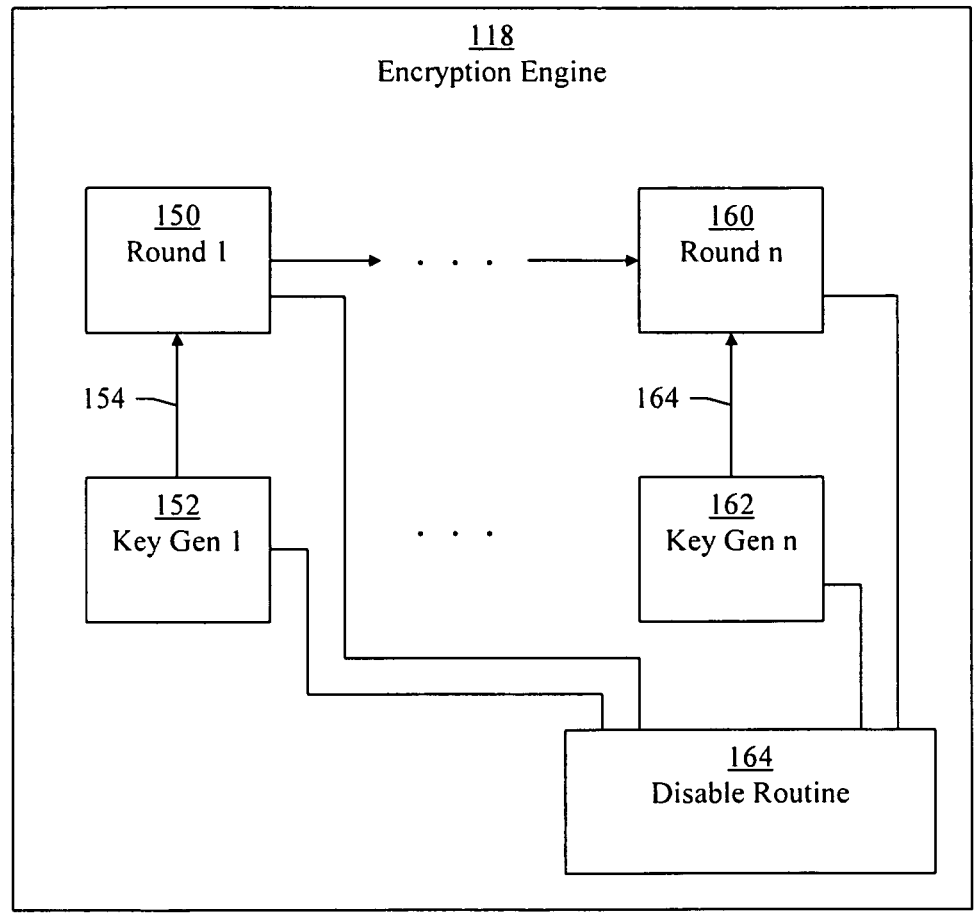
FIG. 3 depicts a block diagram of an exemplary encryption engine according to one embodiment of the invention.

The block diagram of FIG. 3 logically depicts an encryption engine 118 that is implemented as an FPGA. The FPGA includes functional blocks of logic 150, 152, 160, 162. In this particular example, the encryption algorithm is AES and, thus, there are logical blocks associated with the different rounds of the algorithm. One of ordinary skill will recognize that other encryption algorithms may be used without departing from the scope of the present invention.

The logic block 150 performs the multiple steps of the first round of the AES algorithm. The logic block 152 performs the necessary key expansion to generate the key used in the first round of the AES algorithm. Similar functionality is provided by blocks 160 and 162 for a subsequent round of the AES algorithm. Also shown are respective data pathways 154, 164 for the key to be received by the logic blocks 150, 160. Although not explicitly depicted, similar functional blocks exist for all rounds of the algorithm.

The encryption engine 118 also includes a disable routine 164 that when executed modifies or deletes portions of the other logic blocks that implement the encryption/decryption algorithm. For example, if the underlying platform is an FPGA, the disable routing rewrites some of the logic blocks 150, 160 and/or rewrites some of the key generation blocks 152, 162. If the underlying platform is an ASIC, then Flash storage where similar logic is stored may be deleted or overwritten.

Alternatively, the disable routine 164 may disable the data paths 154, 164 so that a key is generated but never reaches the appropriate logic block 150, 160. For example, the data paths 154, 164 may be implemented as a multiplexer coupled to the various logic blocks 150, 160. By disabling one or more inputs or outputs of the multiplexer, the encryption engine 118 is effectively disabled.

According to one embodiment, the disable routine 164 disables a plurality of the key generation logic blocks 152, 162. For example, if there are 12 such blocks, then between 3 and 7 key generation blocks are disabled (other numbers may be used as well). To further obscure what exactly is disabled within the encryption engine 118, the disable routine 164 may perform in a random or partially-random fashion. For example, the disable routine 164 may randomly select the number of key generation blocks to disable (e.g., any number between 3 and 7). Further, the particular key generation blocks selected for disablement may be selected at random as well. Thus, after the encryption engine 118 is disabled by the disable routine 164, it will be nearly impossible to determine exactly what portions of the engine 118 were disabled.

In addition to instances in which a seed is used and the disabling of the encryption engine is performed as described above, there are many instances in which a password may be used as well in conjunction with the storage device 100. In some of these instances in which the host system 102 is supplying the password, the disabling of the password may be automatically controlled by the host system 102. In operation, the encryption engine 118 utilizes the password to generate the key 120 to encrypt and decrypt data. If the password is no longer provided by the host system 102, then the engine 118 cannot generate a key 120 and is effectively disabled thereby securing the data.

Because of the wide variety of ways that the host system 102 may provide the password to the encryption engine 118, there are at least an equal variety of ways that the host system 102 can disable the password. For example, the interface 122 that provides the connection between the password and the engine 118 may be disabled or rendered inoperative by a command from the host system 102. Alternatively, the storage location within the host system 102 where the password is located may be disabled or rendered inoperative by a command from the host system 102. Additionally, if a software application of the host system 102 is providing the password, then execution of this application may be terminated by the host system 102. In each of these alternatives, and in the many other possible ones, the disabling of the password effectively secures the data within the storage media 110 quicker and simpler than techniques that require overwriting each storage location multiple times. More specifically, in a solid-state drive even the data in those Flash blocks that can no longer be overwritten or deleted are still encrypted and secure.

The determination that a risk is present to the security of the storage device 100 may be accomplished in a variety of different ways. For example, the host system 102 may have specialized hardware that allows a user to simply push a button, throw a switch, or pull a jumper block to indicate to the host system 102 that a risk is present. In response, the host system 102 immediately generates the appropriate commands to disable the encryption engine 118 (by way of disabling the password, the key 120, the seed 124, the algorithm itself, or some combination thereof). Alternatively, the host system 102 may automatically sense conditions (e.g. environmental or system conditions) to determine if a risk is present. For example, the host system 102 may sense that it (or some other component) is experiencing a low-power or no-power condition and, in response, immediately disable the encryption engine 118. One skilled in the art will recognize that many different predetermined conditions may be used by the invention to determine the presence of a security risk.

Figure 4:
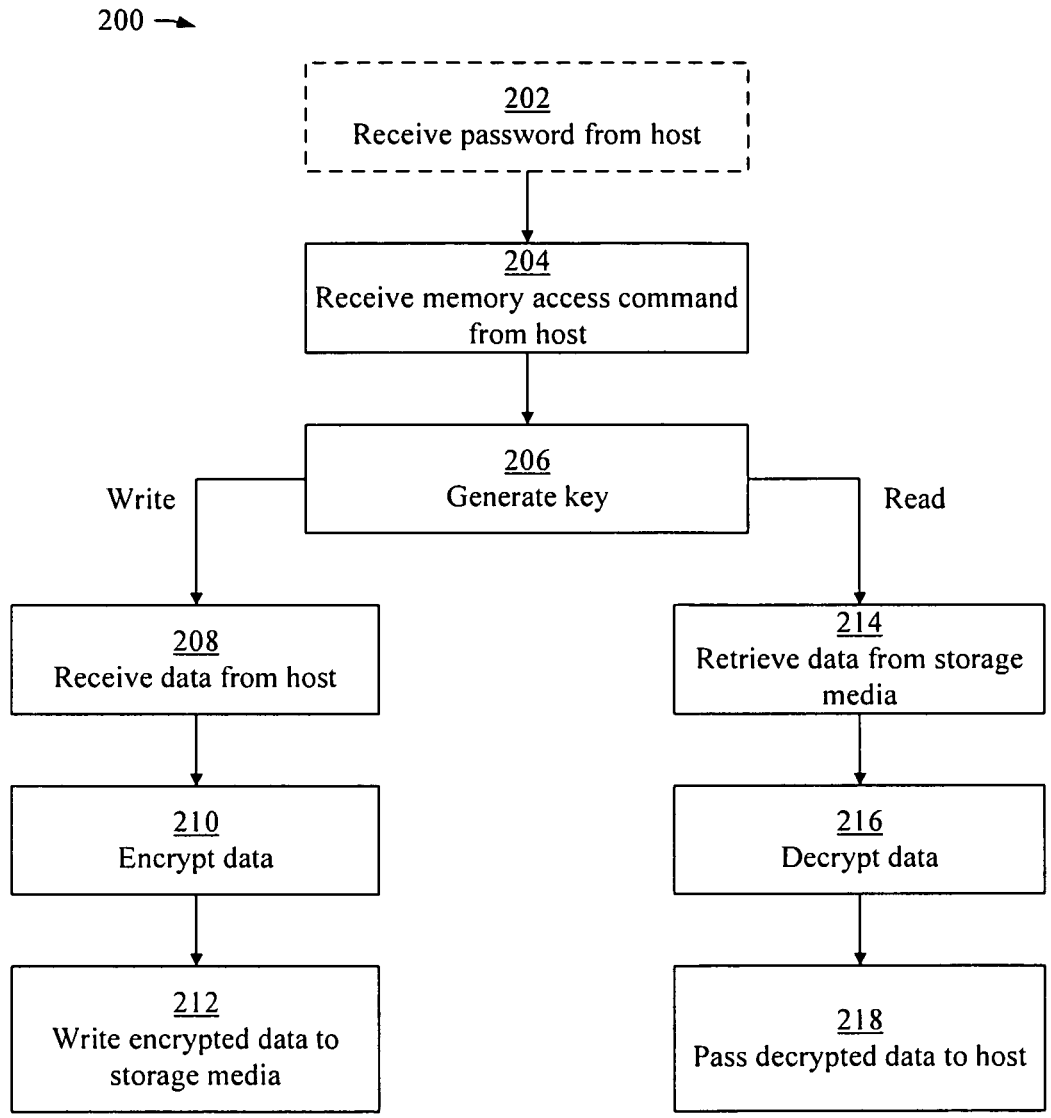
FIG. 4 depicts a flowchart of an exemplary algorithm for providing secure data storage in accordance with one embodiment of the invention.

FIG. 4 depicts a flowchart of an exemplary algorithm 200 for providing secure data storage in accordance with the principles of the present invention. In step 202, a storage device receives a password from a host system that has access to the storage device. The password from the host system may be automatically provided such that a user of the host system is unaware of it or the password may be one explicitly provided by a user. As discussed above, the use of a password is an optional feature of the invention. Accordingly, step 202 does not occur in embodiments where a password is not used.

In step 204, the storage device receives a command from the host system to access a storage location within the storage device. The receipt of a password and a command can happen in either order or even concurrently. A storage access command may, for example, be either a READ or a WRITE command and may refer to a single block of data or multiple blocks of data, as is known in the art.

In preparation for accessing the desired storage location, the storage device generates an encryption/decryption key, in step 206, using a seed and/or a password. For example, if the storage device implements the AES, then one of various sized keys may be generated. Depending on the intended use of the storage device, the key length may be 128-bits, 192-bits, 256-bits, or even more. Keys of different sizes are expressly contemplated within the scope of the present invention.

If the storage device receives a WRITE command, then the storage device also receives, in step 208, unencrypted data from the host system. Using the key previously generated, the storage device encrypts the data, in step 210. The encryption may be performed on a stream of data or at the block-level, but results in all of the data being encrypted. The encrypted data is then written to the storage location within the storage device, in step 212.

If the storage device receives a READ command from the host system, then the encrypted data stored at the specified storage location is retrieved in step 214. Using the generated key, the encrypted data is then, in step 216, decrypted. Finally, the storage device returns the unencrypted data to the host system in step 218. In the above steps, the encryption/decryption key is needed only when performing the encryption and decryption steps. Accordingly, generating the key in step 206 may be performed on-the-fly, during the operation of the storage device, or for each storage access command to eliminate the need to store the key in a storage location of the storage device. In other instances the key may be stored within the storage device and, therefore, only generated once. In this case, the key would be retrieved from storage in step 206 instead of being generated each subsequent time the key was needed.

Figure 5:
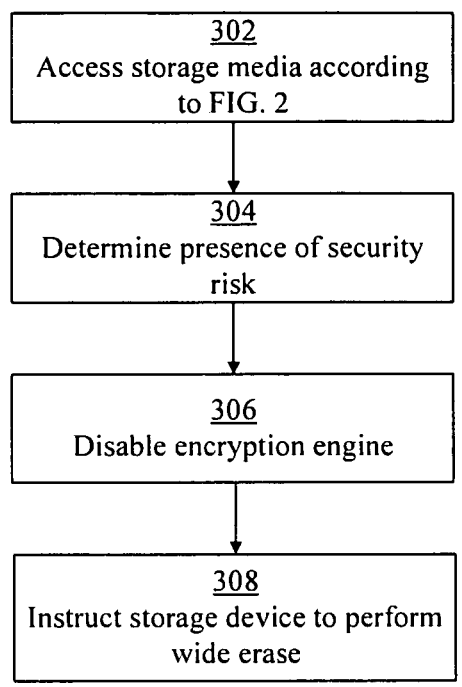
FIG. 5 depicts a flowchart of an exemplary algorithm for securing a storage device in accordance with one embodiment of the invention.

FIG. 5 depicts a flowchart of an exemplary algorithm for securing a storage device in accordance with the principles of the present invention. In accordance with this algorithm, a host system may access, in step 302, a secure storage device in a manner similar to that depicted in FIG. 2. In other words, the host system sends and receives unencrypted data to the storage device. The storage device, using a seed and/or a password, stores the data in encrypted form as well as decrypts stored data before returning it to the host system.

In step 304, the host system determines that a security risk to the storage device is present. This determination may be made by monitoring a number of inputs to determine if any indicate the presence of a predetermined condition, such as a security risk. Because quick detection of the conditions is preferable, these inputs may operate as interrupts to the host system rather than waiting for the host system to actually poll the input. As described earlier, some of these inputs may be triggered by express actions of a user or may be triggered by system or environmental conditions monitored by the host system or the storage device.

In response to the host system determining that a certain condition (e.g., a security risk) is present, the host system disables the encryption engine in step 306. One exemplary method of disabling an encryption engine has previously been described with respect to FIG. 3. In addition, a seed and/or a password, if used, may be disabled. The disabling of the seed and/or password may take place on the storage device, within the host system, or both. For example, the interface of the storage device receiving the seed and/or password may be instructed to become inoperable, or, alternatively, the facility within the host system that provides the seed and/or password may be instructed to become inoperable. Without the seed and/or password, the storage device becomes unable to generate a key that can decrypt the data within the storage of the storage device.

As an additional, but optional step, the host system may also instruct the storage device, in step 308, to perform a wide-erase of its storage. For example, in a solid-state drive utilizing Flash blocks, a wide-erase command may be used to quickly erase large blocks of data. As a result, in response to a security risk being detected, most data is erased from the solid-state drive. Even for those blocks that can no longer be erased or overwritten, any data retrieved from there will remain encrypted due to the actions taken in step 306 described above.

In instances in which it may be preferable to store, at least temporarily, the encryption/decryption key within the storage device, simply disabling the password may not be sufficient to secure the stored data. Similarly, if only an internally stored seed is used by the encryption engine 118, then data stored on the device remains accessible. In these instances, instead of disabling the password, or possibly in addition to disabling the password, the stored key, or stored seed, is disabled. For example, when the host system determines that a security risk is present, then it may issue a command to the storage device to clear the key from its storage and/or to overwrite the seed storage location. Returning to FIG. 5, this command occurs at step 306 and may, for example, instruct the storage device to erase part or all of the key that it is storing. With part or all of the key erased, the encryption engine of the storage device is no longer able to decrypt data that is retrievable from the storage device. Similarly, if the seed is erased instead of the key, the encryption engine is disable as well.

Figure 6:
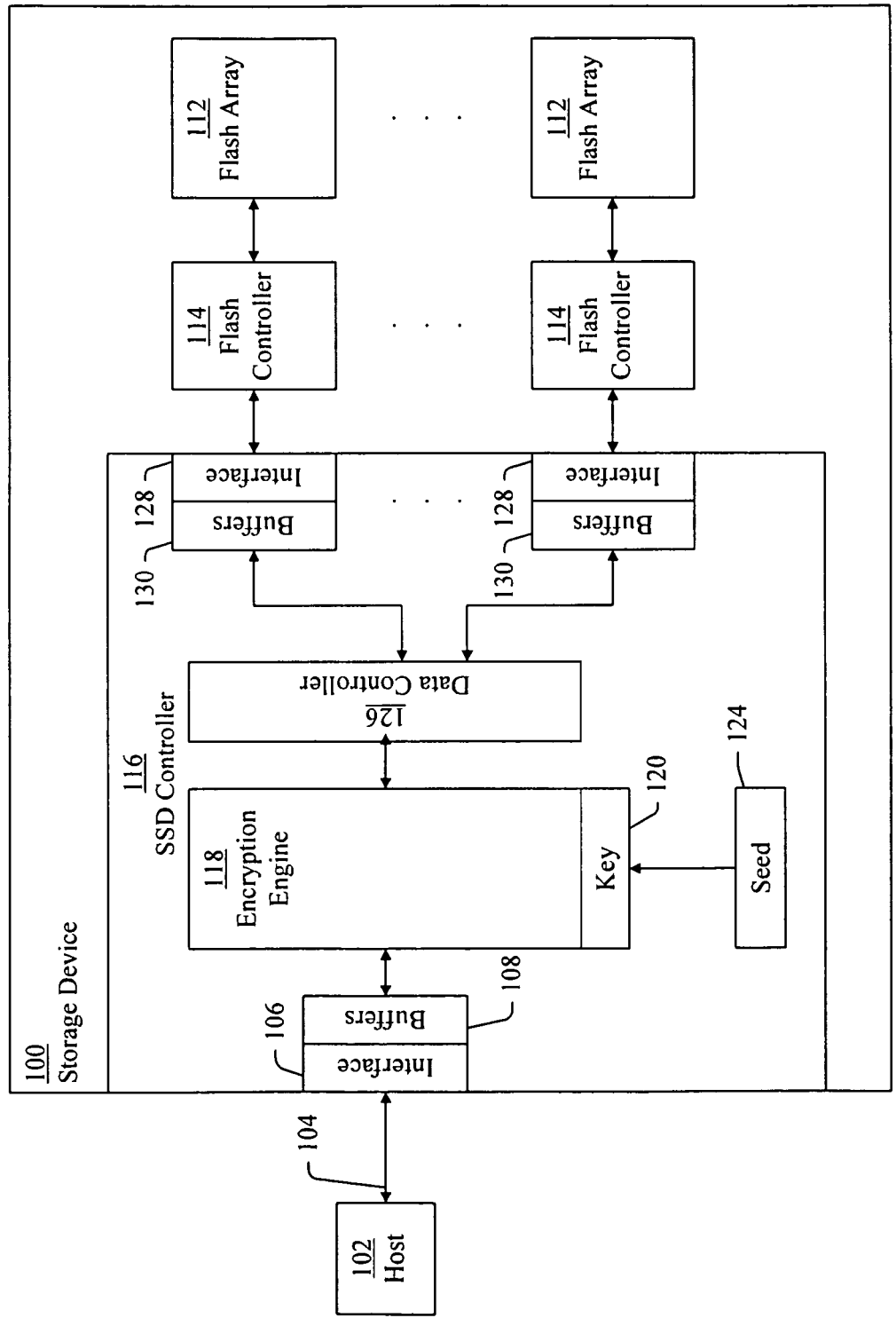
FIG. 6 depicts a block diagram of a storage device in accordance with one embodiment of the invention.

FIG. 6 depicts a block diagram of a storage device 100 in accordance with another embodiment of the invention. Unlike the storage devices depicted in FIGS. 1 and 2, the encryption engine 118, the key 120 and the seed 124 are incorporated into the SSD controller 116. The SSD controller 116 may be implemented in any of a number of ways known to those skilled in the art. For example, the SSD controller 116 may be implemented in one or more ASICs or FPGAs.

Referring to FIG. 6, the SSD controller 116 includes the interface 104 and buffers 108 for receiving data and commands from the host system 102, the encryption engine 118 for encrypting/decrypting data using the key 120 and the seed 124, and data controller 126 for distributing/collecting data to/from interfaces 128 and buffers 130, which receive the data from or transfer data to the flash controllers 114. The overall operation of the storage device 100 depicted in FIG. 6 is the same as that described above with reference to the embodiments depicted in FIGS. 1 and 2, and therefore will not be repeated. In addition, one of ordinary skill in the art will recognize that modifications similar to those described above may be made to the storage device 100 without departing from the scope of the invention. For example, the seed 124 may be external to the storage device 100 and accessed via an interface. In addition, the encryption engine 118 may use a password provided from the host system 102 or via another interface to generate the key 120 for encryption/decryption operations.

Figure 7:
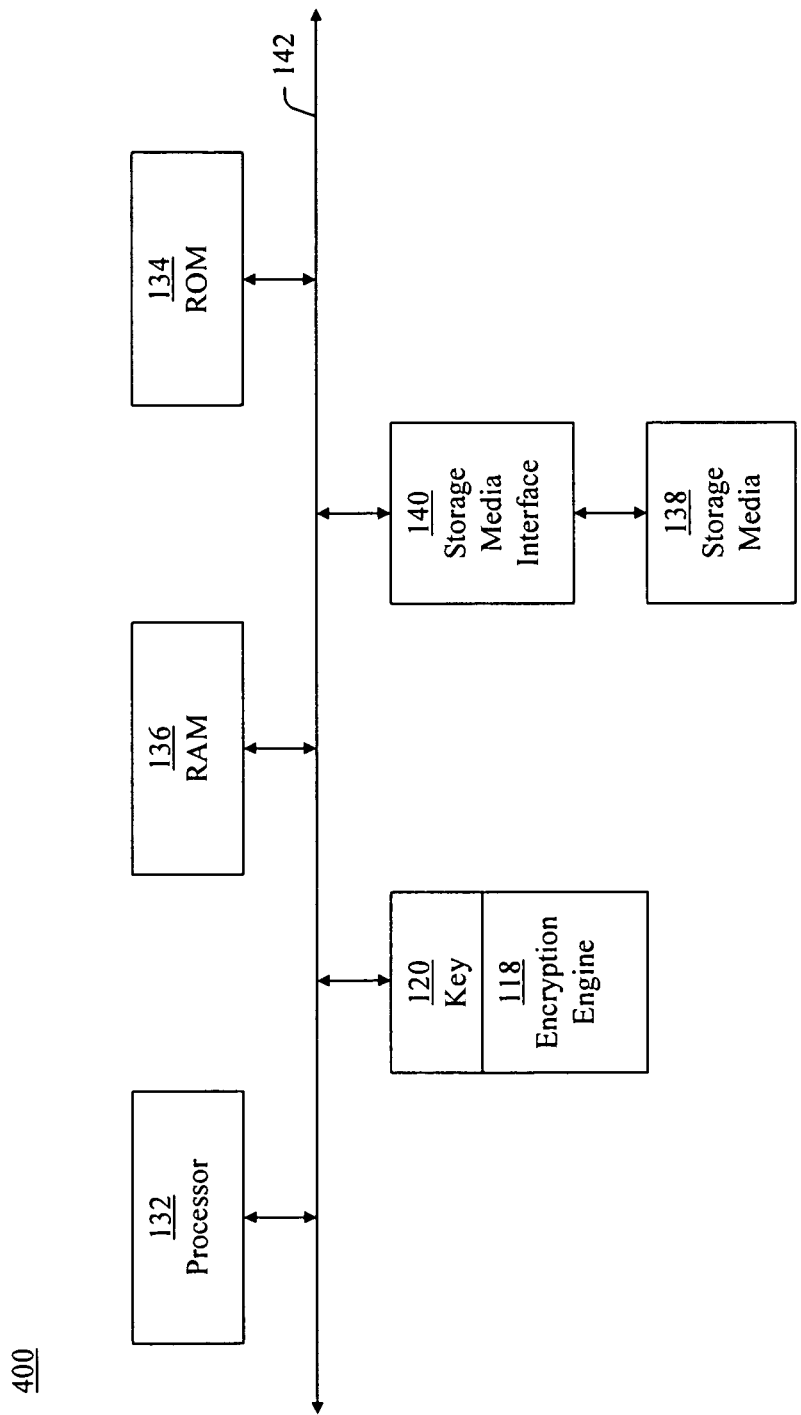
FIG. 7 depicts a block diagram of a computing system in accordance with one embodiment of the invention.

FIG. 7 depicts a block diagram of a computing system 400 according to another embodiment of the invention. As shown in FIG. 7, computing system 400 includes a processor 132, ROM (read-only memory) 134, RAM (random-access memory) 136, storage media 138, a storage media interface 140, an encryption engine 118, a key 120 and a bus 142. The processor 132 executes instructions stored in ROM 134 and RAM 136. ROM 134 typically stores a set of instructions executed at the time of initialization of the computing system 400. This set of instructions generally provides basic functionality to the computing system 400, such as a BIOS, allowing the computing system 400 to operate. RAM 136 provides a workspace for the processor 132 to load additional instructions for execution and to temporarily store data. The bus 142 represents one or more communication buses used to communicate data and commands between components within the computing system 400. The various types of buses used within computing systems are well known to those skilled in the art and will not be described in detail herein.

Computing system 400 also includes storage media 138, which is connected to the bus 142 via a storage media interface 140. The storage media 138 represents any of a number of types of storage media, which include magnetic storage media, optical storage media, Flash storage media, etc. The storage media interface 140 is an interface that facilitates communication between the storage media 136 and the rest of the computing system 400. Examples of possible interfaces include ATA, SCSI, Flash, USB, etc. While only a single instance of the storage media 138 and the associated storage media interface 140 are depicted in FIG. 7, one skilled in the art will recognize that multiple instances, as well as multiple types, of storage media 138 and associated storage media interface 140 may be included in the computing system 400 without deviating from the scope of the present invention. For example, the computing system 200 may include a hard disk drive, an optical disk drive and a Flash drive.

Referring again to FIG. 7, computing system 400 further includes an encryption engine 118 and a key 120. The encryption engine encrypts/decrypts data stored in storage media 138. The data may be generated within the computing system 400 or, alternatively, the data may be transferred to and from a host device (not shown) connected to the computing system 400. The operation of the encryption engine 118 and the key 120 correspond to that described above with respect to other embodiments. Specifically, the encryption engine 118 encrypts/decrypts data using the key 120. The key 120 is generated using a seed and/or a password. The seed may be stored internally to the computing system 400 or, alternatively, may be accessed externally via an interface connected to the bus 142. The password, if used, may be input to the computing system 400 using interface devices such as a keyboard or a mouse, or may be generated using other means known to those skilled in the art.

As with the other embodiments described above, the computing system 400 facilitates the secure storage of data in the storage media 138. To provide this secure storage, the processor 132 executes a sequence of instructions to direct all data being stored to the encryption engine 118 prior to sending it to the storage media 138 and to direct all requested data to be sent to the encryption engine 118 after it has been retrieved from the storage media 138. In alternative embodiments, the encryption engine 118 may be set up using well known proxy techniques to intercept all data transfers involving the storage media 138.

The foregoing description is provided to enable any person skilled in the art to practice the various embodiments described herein. Various modifications to these embodiments will be readily apparent to those skilled in the art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the claims. Moreover, nothing disclosed herein is intended to be dedicated to the public regardless of whether such disclosure is explicitly recited in the claims.

What is claimed is:

1. A storage device comprising:
   a host interface configured to transfer data between a host and said storage device;
   a storage medium configured to store data transferred from the host;
   a seed interface configured to access a seed value; and
   an encryption engine configured to receive data from the host via said host interface, access the seed value via the seed interface, generate a key based on the seed value, encrypt the data using the key, and provide the encrypted data to said storage medium for storage, said encryption engine further configured to receive the encrypted data from said storage medium, decrypt the encrypted data using the key, and provide the data to the host via said host interface,
   wherein the storage device is configured to instruct the seed interface to become inoperable, in response to a predetermined condition corresponding to a security risk to the storage device,
   wherein said storage device further comprises a storage location for storing the seed value,
   wherein said storage device is further configured to erase the seed value from said storage location in response to the predetermined condition, and
   wherein said storage device is configured to disable at least part of the key in response to the predetermined condition.

2. The storage device of claim 1, wherein said encryption engine is configured to generate the key based on a password.

3. The storage device of claim 2, wherein the password is received from the host via said host interface.

4. The storage device of claim 1, wherein the key is generated by said encryption engine for each access by the host to said storage device.

5. The storage device of claim 1, wherein said encryption engine comprises a plurality of functional logic blocks, wherein said encryption engine is further configured to modify one or more of the functional logic blocks in response to the predetermined condition.

6. The storage device of claim 1, wherein said encryption engine comprises executable code, wherein said encryption engine is further configured to modify a portion of the executable code in response to the predetermined condition.

7. The storage device of claim 1, wherein said storage medium is a Flash memory.

8. A secure storage system, comprising:
   a host; and
   a storage device, said storage device further comprising:
   a host interface configured to transfer data between said host and said storage device;
   a storage medium configured to store data transferred from said host;
   a seed interface configured to access a seed value; and
   an encryption engine configured to receive data from the host via said host interface, access the seed value via the seed interface, generate a key based on the seed value, encrypt the data using the key, and provide the encrypted data to said storage medium for storage, said encryption engine further configured to receive the encrypted data from said storage medium, decrypt the encrypted data using the key, and provide the data to the host via said host interface,
   wherein the storage device is configured to instruct the seed interface to become inoperable, in response to a predetermined condition corresponding to a security risk to the storage device,
   wherein said storage device further comprises a storage location for storing the seed value,
   wherein said storage device is further configured to erase the seed value stored in said storage location in response to predetermined condition, and
   wherein said storage device is configured to disable at least part of the key in response to the predetermined condition.

9. The secure storage system of claim 8, wherein said encryption engine is configured to generate the key based on a password.

10. The secure storage system of claim 9, wherein the password is received from said host via said host interface.

11. The secure storage system of claim 8, wherein the key is generated by said encryption engine for each access by said host to said storage device.

12. The secure storage system of claim 8, wherein said encryption engine comprises a plurality of functional blocks, wherein said encryption engine is further configured to modify one or more of the functional blocks in response to the predetermined condition.

13. The secure storage system of claim 8, wherein said encryption engine comprises executable code, wherein said encryption engine is further configured to modify a portion of the executable code in response to the predetermined condition.

14. The secure storage system of claim 8, wherein said storage medium is a Flash memory.

15. A method for securely storing data, the method comprising the steps of:
- receiving a command from a host;
- accessing a seed value via a seed interface;
- generating a key based on the seed value;
- if the command is a read command, decrypting encrypted data retrieved from a storage medium using the key and providing the decrypted data to the host;
- if the command is a write command, encrypting data received from the host using the key and storing the encrypted data within a storage medium; instructing the seed interface to become inoperable, in response to a predetermined condition corresponding to a security risk to storage;
- storing the seed value in a storage location;
- erasing the seed value stored in the storage location in response to the predetermined condition; and
- disabling at least part of the key in response to the predetermined condition.

16. The method of claim 15, wherein the key is generated based on a password.

17. The method of claim 15, wherein the key is generated for each read and write command received from the host.

18. The method of claim 15, further comprising the step of modifying, in response to the predetermined condition, at least one of a plurality of functional blocks used to encrypt and decrypt data.

19. The method of claim 15, further comprising the step of modifying, in response to the predetermined condition, at least one portion of software used to encrypt and decrypt data.

20. The method of claim 15, wherein the storage medium is Flash memory.

* * * * *